United States Patent
Moore et al.

(10) Patent No.: US 6,874,128 B1
(45) Date of Patent: Mar. 29, 2005

(54) MOUSE DRIVEN SPLITTER WINDOW

(75) Inventors: Aaron Moore, Zephyr Cove, NV (US); Thomas Becker, Zephyr Cove, NV (US)

(73) Assignee: Zephyr Associates, Inc., Zephyr Cove, NV (US)

( * ) Notice: Subject to any disclaimer, the term of this patent is extended or adjusted under 35 U.S.C. 154(b) by 0 days.

(21) Appl. No.: 09/520,403

(22) Filed: Mar. 8, 2000

(51) Int. Cl.[7] .............................................. G09G 5/00
(52) U.S. Cl. ................. 715/792; 715/803; 715/781; 715/759; 715/784; 715/788; 715/798
(58) Field of Search .......................... 715/792, 803, 715/781, 759, 784, 788, 798; 345/792, 803, 781, 759, 784, 788, 798

(56) References Cited

U.S. PATENT DOCUMENTS

| | | | | |
|---|---|---|---|---|
| 5,999,177 A | * | 12/1999 | Martinez | .................... 715/784 |
| 6,141,007 A | * | 10/2000 | Lebling et al. | ............. 345/764 |
| 6,202,200 B1 | * | 3/2001 | House et al. | ................... 717/4 |
| 6,310,631 B1 | * | 10/2001 | Cecco et al. | ................ 345/792 |
| 2002/0191028 A1 | * | 12/2002 | Senechalle et al. | ......... 345/800 |
| 2003/0210274 A1 | * | 11/2003 | Subramanian et al. | ...... 345/809 |
| 2004/0008224 A1 | * | 1/2004 | Molander et al. | ........... 345/764 |
| 2004/0160462 A1 | * | 8/2004 | Sheasby et al. | ............. 345/788 |

* cited by examiner

Primary Examiner—Heather R. Herndon
Assistant Examiner—Mylinh T Tran
(74) Attorney, Agent, or Firm—Lerner, David, Littenberg, Krumholz & Mentlik, LLP (57) ABSTRACT

A mouse driven splitter program and algorithm is disclosed herein. The invention is a user interface which solves the problem of interactively designing splitter window layouts by combining maximum flexibility and generality with user-friendliness. The invention allows a program user to create every possible combination of panes and nested splitter windows with no limitation on the nesting depth. The entire process is purely graphical, employing only the mouse as a tool. Similarly, the user can place content, such as a particular chart in any pane using the mouse only.

15 Claims, 12 Drawing Sheets

CNode::SplitHorizontally(StartPoint, EndPoint)

FIG. 7: CNode::Cut(StartPoint, EndPoint)

FIG. 8: CNode::CutHorizontally(StartPoint, EndPoint)

FIG. 11: CNode::SplitHorizontally(StartPoint, EndPoint)

FIG. 12: CNode::DeleteSplitterBar(StartPoint, EndPoint)

MOUSE DRIVEN SPLITTER WINDOW

BACKGROUND OF THE INVENTION

1. Field of the Invention

The present invention relates generally to windows based computing programs and more particularly to a mouse driven splitter window layout.

2. The Prior Art

Modern computer systems interact with the user through a graphical user interface (GUI). The fundamental concept of a GUI is that of a window. A word processing program, for example, will display each document in its own separate window. Similarly, accounting and financing programs often display graphical or tabular representations of data in windows. Each window can be independently resized, repositioned, hidden or closed.

Figure 1:
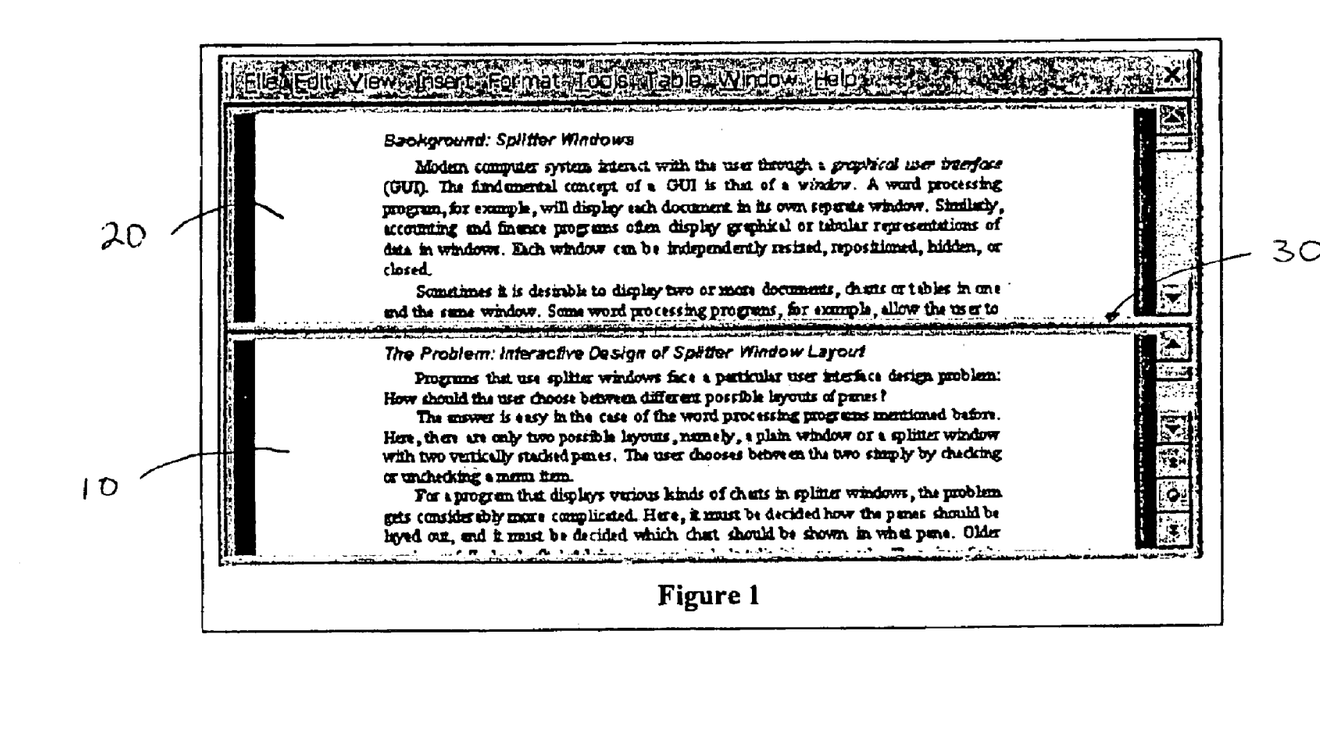
FIG. 1 shows the prior art splitting arrangement for a typical word processing program.

Sometimes it is desirable to display two or more documents, charts or table in one and the same window. Some word processing programs, for example, allow the user to partition a window horizontally into two areas, as shown in FIG. 1. Both areas will then display the window's current document. The two displays 10 and 20 can be scrolled independently, making it possible for the user to view different parts of the document simultaneously.

A window that is divided into two or more displays is called a splitter window. The independent areas of display inside the splitter window are called panes, and the separating bar between them is called a splitter, or splitter bar 30. Splitter bars can be moved horizontally or vertically with the mouse, thus changing the relative size of the panes.

Viewing different parts of a document could of course also be accomplished by opening a second window for the same document. However, the user would then have to go through the motions of positioning the two windows in such a way that they appear next to each other. Furthermore, resizing or repositioning one of the two windows would destroy this arrangement. Using a splitter window has the advantage of keeping the two displays in the same relative position no matter what happens to the entire window.

Another, perhaps even more important application of splitter windows occurs in accounting and finance programs. Here, it is often important to display two or more charts or tables next to each other. A good example would be a chart that displays the performance of several mutual funds over time. In order to evaluate this information, one would want another chart or table nearby that shows the risk characteristics of each mutual fund. Again, it would be possible to use two different windows in such a case. However, to make it easy for the user to always see the two displays simultaneously, it is much better to show them in different panes within a splitter window.

From a programmer's point of view, splitter windows do not per se pose any significant problems. Some development environments offer built-in support for splitter windows. The programmer can then create a splitter window with any given number of horizontal and vertical splitter bars by making a few simple function calls. If splitter windows are not supported by the development environment, it is a non-trivial but essentially routine exercise in GUI programming to implement them.

Figure 2:
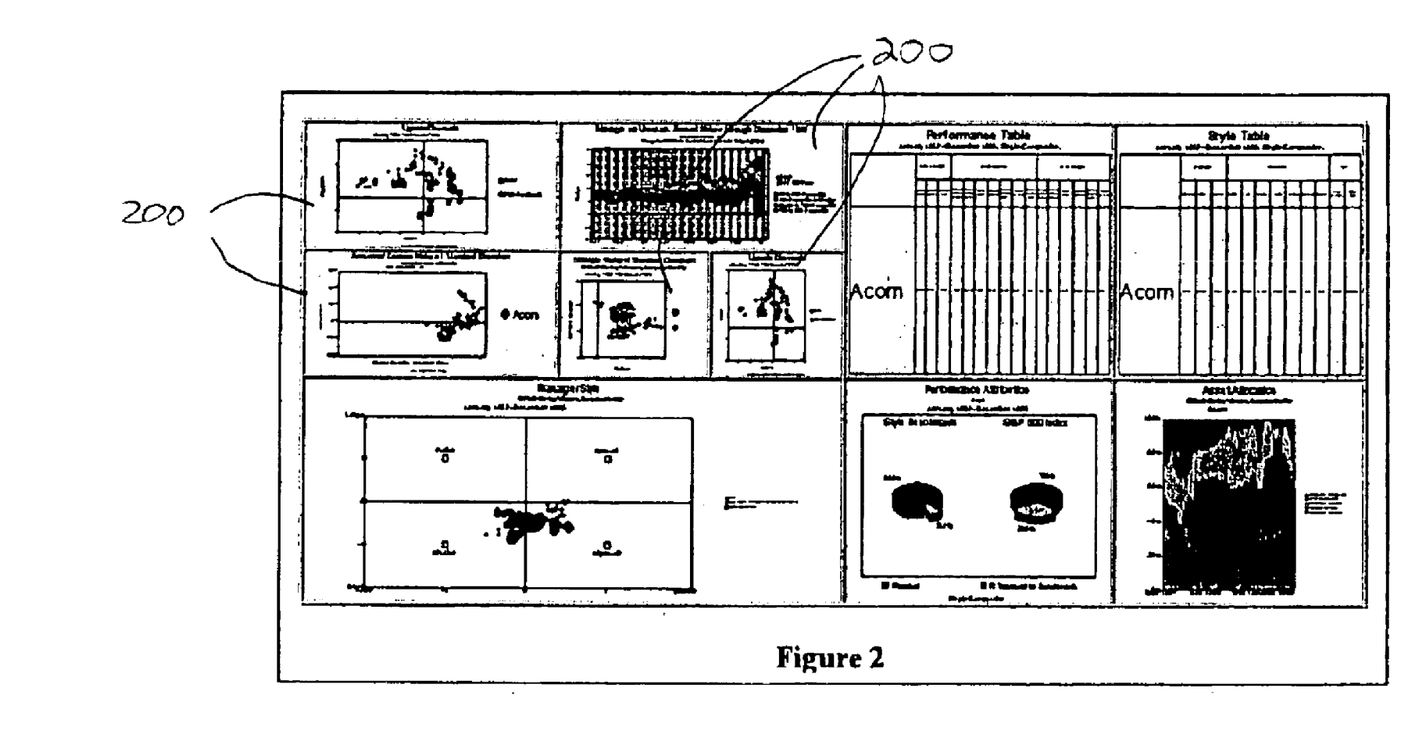
FIG. 2 shows the splitting arrangement possible for a program using a nested splitter program.

Using standard support for splitter windows, one can run horizontal splitter bars all the way across the window and vertical splitter bars all the way from the top to the bottom of the window. For maximal flexibility in the design of the user interface, it should also be possible to have nested splitter windows 200 as shown in FIG. 2. Here the main window is divided into six panes, using one horizontal and two vertical splitter bars. The top left pane is itself a splitter window made up of four panes, and the bottom right pane of these is again a nested splitter window made up of two panes side by side. Again, nested splitter windows may or may not be directly supported by the development environment. If they are not, implementing them is a non-trivial but essentially routine task.

Programs that use splitter windows face a particular user interface design problem. Namely, how should the user choose between different possible layouts of panes? With respect to the aforementioned prior art word processing programs, the answer is easy. There are only two possible layouts, namely, a plain window or a splitter window with two vertically stacked panes. The user chooses between the two simply by checking or unchecking a menu item.

For a program that displays various kinds of charts in splitter windows, the problem gets considerably more complicated. Here, it must be decided how the panes should be layed out, and it must be decided which chart should be shown in what pane. Older versions of Zephyr Associates' "StyleAdvisor" use a simple but limiting approach. There is a finite number of possible layouts, and the user selects one of these by checking or unchecking several menu items such as "Tables Only," or "Show Performance Graph."

Another approach would be to walk the user through a series of questions such as "How many vertically stacked panes would you like?" and "How many horizontally stacked panes would you like?" These questions would then have to be repeated for each pane to determine the subdivisions of nested splitter windows. After that, the user would still have to decide which chart to show in what pane.

While the first approach of having a finite number of layouts obviously places an undue limitation on the program's functionality, the second one of verbally interacting with the user is severely lacking in user-friendliness.

SUMMARY OF THE INVENTION

The present invention is a mouse-driven splitter program and user interface which splits a display window by the dragging of a mouse from one point in a graphical user interface display to another. The program automatically halves the display according to the user identified split and creates new display windows according to the split. The program solves the problem of interactively designing splitter window layouts by combining maximal flexibility and generality with user-friendliness. The invention allows a program user to create every possible combination of panes and nested splitter windows with no limitation on the nesting depth. The entire process is purely graphical, employing only the mouse as a tool. Similarly, the user can place content, such as a particular chart in any pane using the mouse only.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons. Although the instant disclosure describes the splitter programs use in conjunction with a "mouse" other embodiments of the invention including its use in conjunction with touch screens, touch pads, lights pens, joysticks, pointing sticks, stylus and tablet combinations as well as other cursor movement devices will readily suggest themselves to such skilled persons.

Normally, the design process entered into by a user wishing to create a document involving graphical displays consists of two parts: The layout of the panes, including nested splitter windows, and the placement of specific content, such as a chart or table, into each pane. The invention does not require the user to perform these two parts of the task separately. At any stage of the design process, the user can place content into some or all of the panes and then continue to further subdivide any of the panes, or to remove subdivisions.

Figure 3:
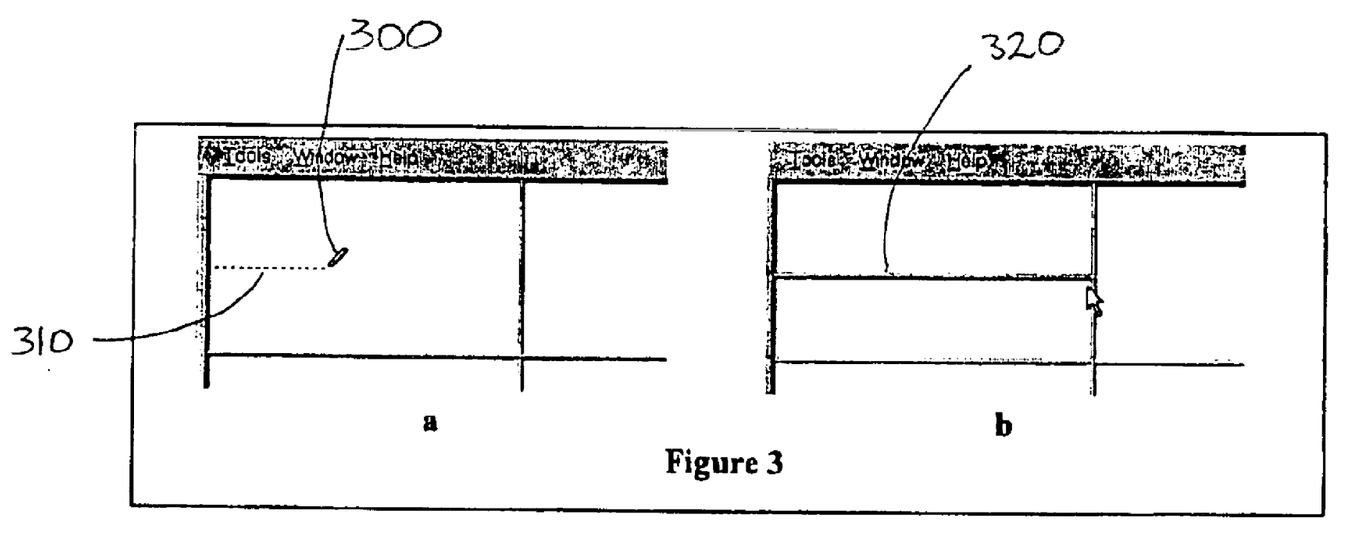
FIG. 3 shows the operation of a mouse-driven splitter window.
Figure 4:
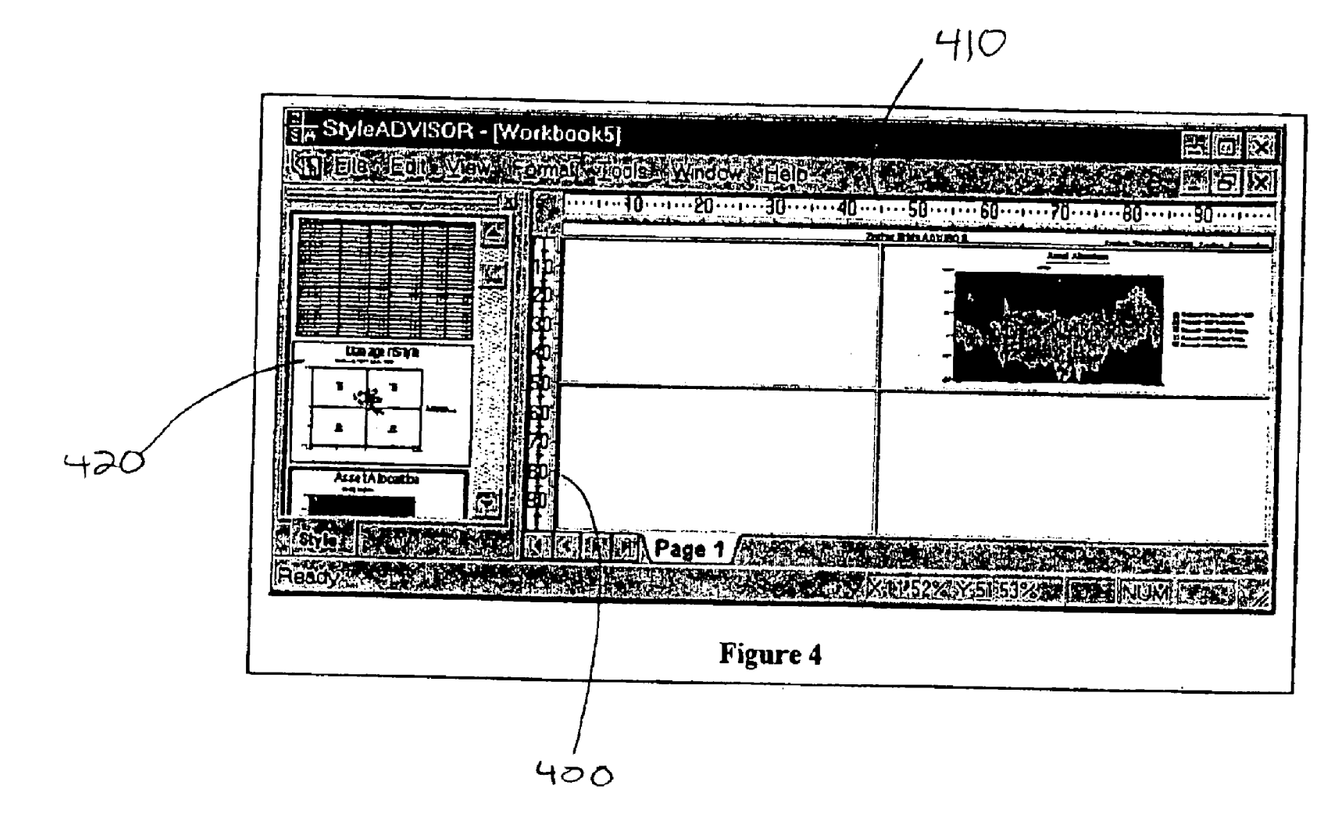
FIG. 4 shows the mouse-driven splitter window with vertical and horizontal rulers.

FIG. 3 shows the user operation of the splitter program. From the user's point of view, the process of dividing the splitter window into panes and nested splitter windows works as follows. When a window is in "splitter design mode" and the user moves the mouse cursor near an edge of the window or near some splitter bar inside the window, the cursor turns into a knife 300. When the user presses the left mouse button and drags the mouse, a horizontal or vertical dotted line, as the case may be, is drawn from the starting point to the current mouse position 310 (see FIG. 3a). If the user releases the left mouse button while the cursor is not near some splitter bar or window edge, the dotted line disappears and nothing will happen. However, if the cursor is near a splitter bar or a window edge and the user lets go of the left mouse button, the dotted line will turn into a new splitter bar 320 connecting the begin and end point (see FIG. 3b). The knife-shaped mouse cursor suggests to the user that she is performing a cut in order to subdivide the window into more panes. Referring now to FIG. 4, in order to facilitate an even layout of the panes, the user can optionally show horizontal 400 and vertical 410 rulers and make the new splitter bars snap to the guides.

In addition to inserting new splitter bars with the knife cursor, the user can also remove existing splitter bars. To this end, the user clicks on a splitter bar to select it, then presses the Delete key. Those of ordinary skill in the art will recognize that a variety of keys or menu items can be programmed to accomplish this function. If the selected splitter bar is a horizontal one, the user will be asked if he wishes to remove the pane(s) above or below the bar. For a vertical bar, the question is whether to remove the pane(s) to the right or to the left of the bar. When the user has made a choice and confirmed it, the program will remove the splitter bar and rearrange the remaining panes accordingly. The most straight forward use of the mouse driven splitter window layout is to first subdivide the topmost splitter window into two or more panes. The user can then focus on one of the panes thus created, subdividing them further as desired. However, the strength of the invention's algorithm lies in the fact that it is also possible to cut straight across any number of panes of different nesting depths. The algorithm automatically modifies all affected nested splitter windows as appropriate. Therefore, the user does not have to be bothered with thinking about the concept of nested splitter windows. Instead, it is possible to use the mouse in a completely intuitive way, performing the cuts so as to achieve the desired layout.

The other part of the design process, filling the panes with content, is presented to the user as follows. When a window is in "splitter design mode," a scrollable list box appears to the side of the window 420, as shown in FIG. 4. This list box contains simplified graphical representations of the possible choices for content. Typically, these will be different types of charts and tables. To place one of these charts or tables into a pane, the user simply drags and drops the respective image from the list box to the desired pane.

Some parts of the mouse-driven splitter window layout can be implemented using standard GUI programming techniques. These include placing a scrollable list box with graphical representations of the possible content to the side of the window. The user can then drag and drop an item from the list box to a pane. The program also allows the user to change the screen mouse position indicator to a knife graphic when the window is in "splitter design mode." The program draws a dotted line from the starting point to the current position of the mouse cursor while the user is performing a cut.

The program also recognizes that a cut has been performed, i.e., a new splitter bar is to be inserted connecting two points on window edges or existing splitter bars. The program also allows a user to select an existing splitter bar with the mouse and recognizes through user input that a selected splitter bar is to be deleted.

Further explanation of the algorithm that decides how to modify the arrangement of panes and nested splitter windows when a cut is performed or an existing splitter bar is removed is given. The following description of the pane-cutting algorithm is generic insofar as it does not make any specific assumptions concerning the programming language, the window system, or the operating system. The reader should recall that the invention allows the user to draw cuts between any two window edges or splitter bars, even if the cut runs through an area of nested splitter windows of different nesting depth. This feature accounts for much of the complexity of the algorithm.

The algorithm is described in three steps: First, the underlying data structure is shown, then the method for performing a plane cut is given, and finally, a description of how a splitter bar is removed is given.

Figure 5:
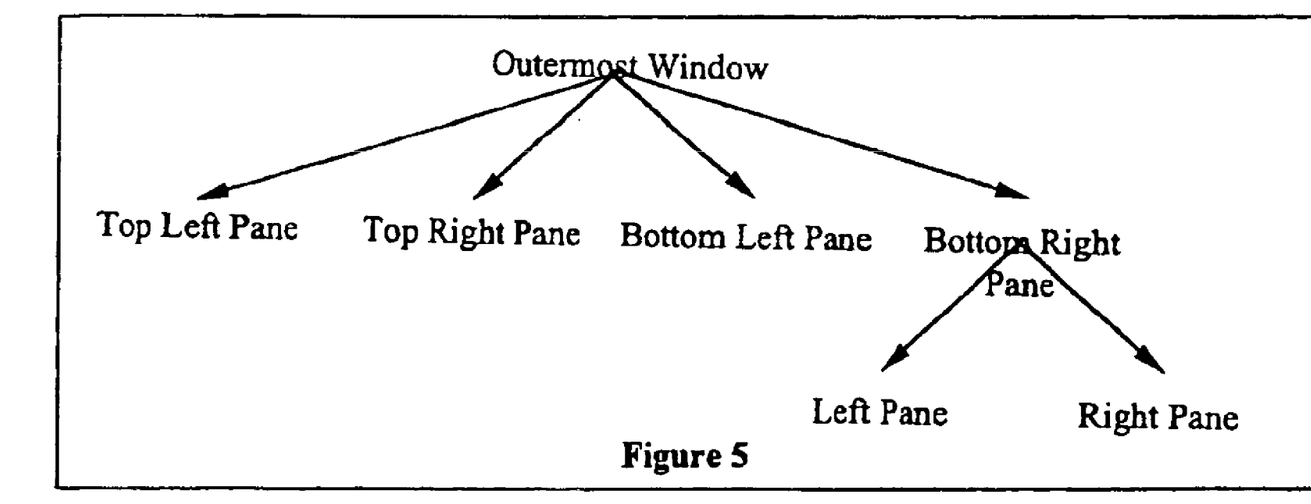
FIG. 5 is a diagram illustrating the internal data set-up of a typical pane and nested splitter window layout.
Figure 6:
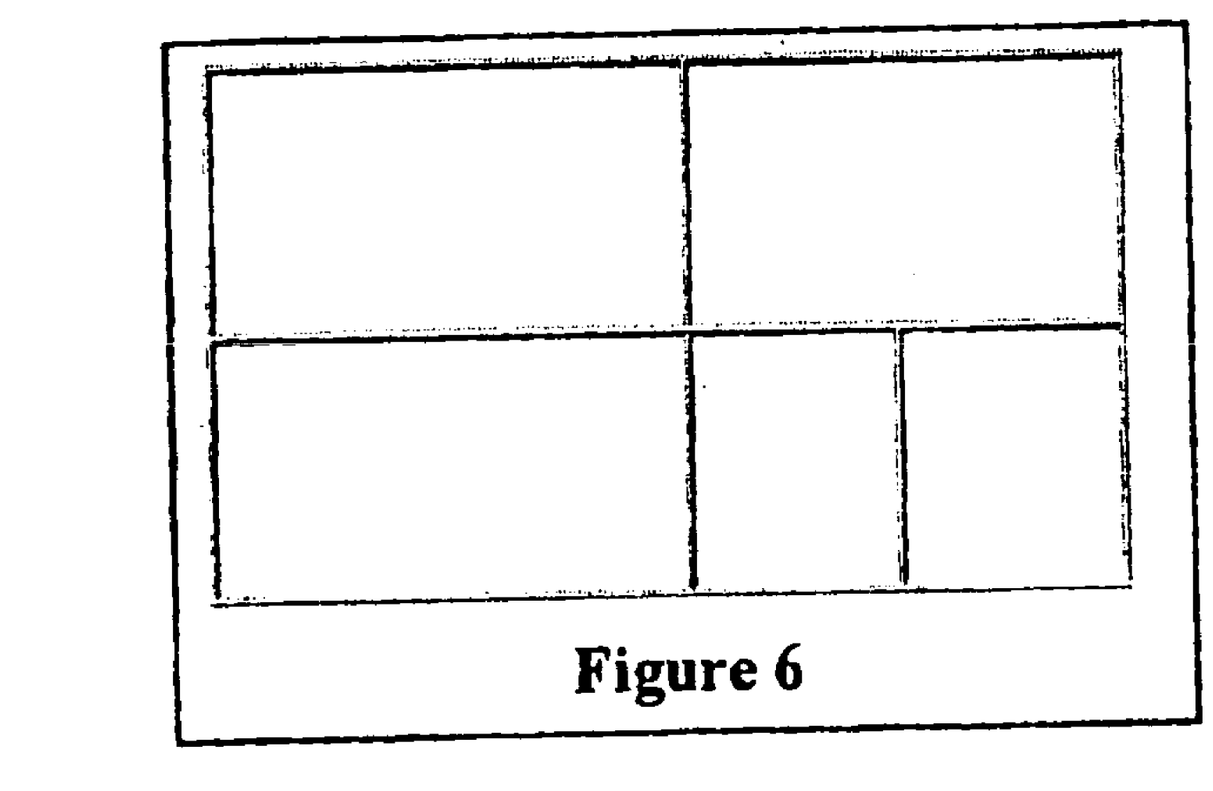
FIG. 6 shows the actual pane and nested splitter window layout of the diagram in FIG. 5.

In order to implement the pane-cutting algorithm, the program maintains an internal data representation of the current layout of panes and nested splitter windows. Preferably, this data representation has the form of a tree, although other data structures may also be used. An example is shown in FIG. 5, which represents the arrangement shown in FIG. 6.

The root of the tree represent the outermost window. The four children of the root represent the four panes of the outermost window. Three of these panes have no children, which means that they contain content windows rather than nested splitter windows. The fourth pane, by contrast, has two children. This means it contains a nested splitter window with two panes.

All that is needed to implement such a tree is a data structure for the nodes. The entire tree is then simply given by its root node. The other nodes can be accessed by following the child pointers. Appendix A shows the node class, called CNode.

The first four data members describe the subdivision into panes: they indicate the number of rows, the number of columns, the relative height of each row, and the relative width of each column. The fifth data member is a matrix that contains pointers to the children of this node. If the number of rows and columns is zero, i.e., the node does not have any children, this matrix is empty. Otherwise, each entry in the matrix corresponds to exactly one pane.

The sixth data member of the node structure establishes the connection to the actual graphical user interface. It is a pointer to the GUI window that is represented by this node. If the number of rows and columns is zero, then this GUI window will be a content window such as a chart, a table, or a text document. If the number of rows or columns is not zero, the GUI window will be a splitter window. Since the algorithm does not refer to any specific properties of the implementation platform (operating system, window system, or development environment), this data member is of little concern in the sequel. Note, however, that a window can be queried for its position on the screen. As a result, the invention will be able to convert a point on the screen to a relative position within a window at any time.

As is customary when working with tree structures, nodes that do not have any children are referred to as a leaf. Note that in the present case, a leaf represents a content window, whereas a non-leaf represents a splitter window. The root of the tree always represents the outermost window. A node at a subsequent level represents a content window or a splitter window that is embedded in a pane of its parent window. Because of this correspondence between nodes and windows, the terms "node" and "window" are interchangeable in the discussion below. The methods (i.e., member functions) of the node class are explained in detail below.

Figure 7:
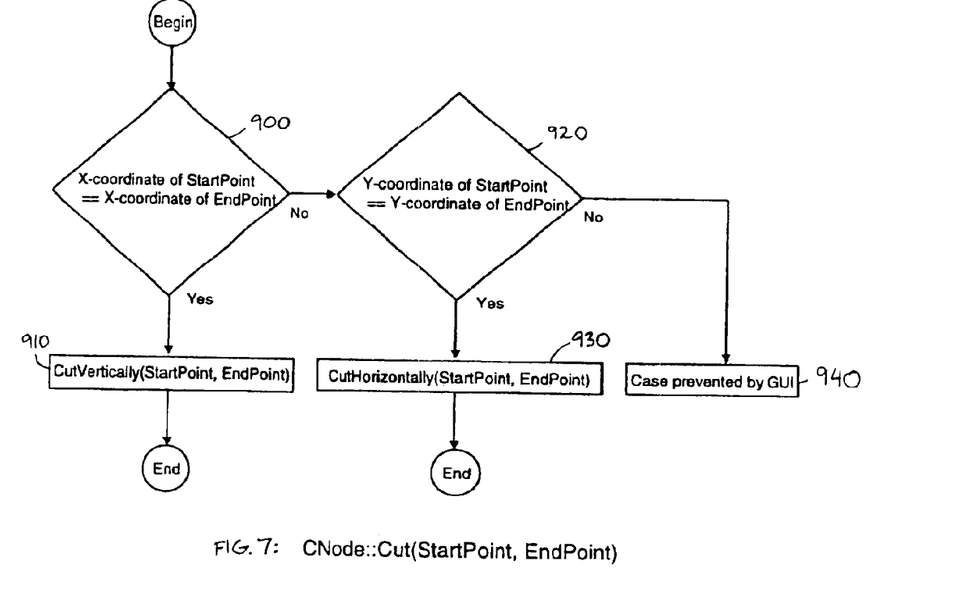
FIG. 7 shows a flowchart of the Cut( ) routine.

This section contains a description of what happens when the program is notified by the GUI that the user has used the knife cursor to perform a cut. The program has stored the current layout of panes and nested splitter windows in a tree such as the one shown in FIG. 5. The notification contains the coordinates of the start and end points of the cut. The program responds to this by calling the Cut( ) method on the root node. Recall that the root node represent the outermost splitter window. The flowchart for the Cut( ) routine is shown in FIG. 7. The routine simply determines if the cut ran horizontally or vertically and forwards the call to one of the routines CutHorizontally( ) and CutVertically( ). First, the program queries whether the start point x coordinate is equal to the end point x coordinate 900. If the two x coordinates are identical the program engages in the vertical cut, 910. If the two x coordinates are not equal, the program queries whether the start point y coordinate is equal to the end point y coordinate. If they are equal, the program engages in the horizontal cut, 930. If not the Graphical User Interface prevents the cut from occurring 940.

Figure 8:
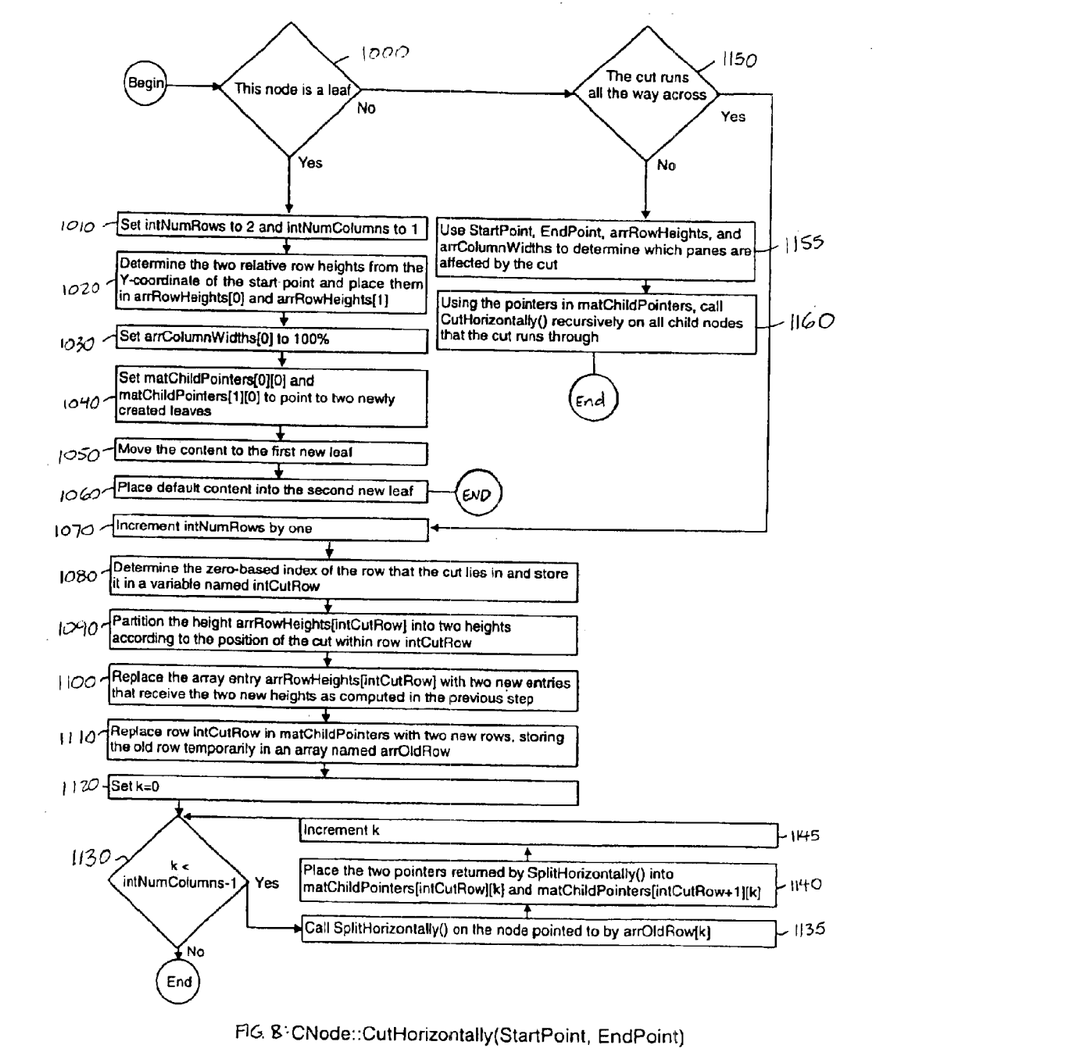
FIG. 8 shows a flowchart of the CutHorizontally( ) routine.

It is assumed that this was a horizontal cut. What happens in the vertical case is so obviously analogous that it needs no separate discussion. FIG. 8 shows the flowchart for CutHorizontally( ). First the program queries to determine whether the node is a "leaf" or not 1000. If so, the program sets intNumRows to 2 and intNumColumns to 1, 1010 and performs the steps detailed by 1020–1060.

As detailed above the method first deals with the case that the node is a leaf. This means that a window is being cut that is not currently subdivided, i.e., it is one that holds content. In this case, the method turns this leaf into a non-leaf with two newly created children. In terms of GUI windows, this means that the content window will be replaced with a splitter window with two vertically stacked panes. If there was already content present, the algorithm encounters a small ambiguity here: Should the content now appear in the new top pane, in the new bottom pane, or in both? The current implementation currently uses the top pane, and it places some default content into the bottom pane. Any other choice is possible, or one could let the user decide.

Figure 9:
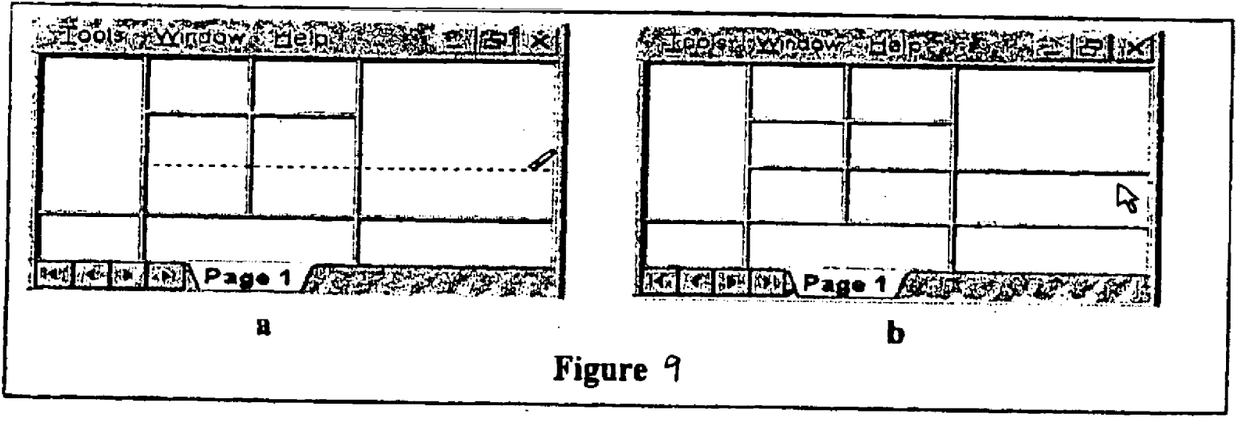
FIG. 9 shows the operation of the mouse-driven splitter used subedge (i.e., not edge to edge).

Next, CutHorizontally( ) treats the case where the cut does not run all the way from edge to edge through the window that is represented by the node. In this case, the window's number of rows and columns will not change. Only those panes that are traversed by the cut will change: each of them will be cut horizontally. This is achieved by making a recursive call of CutHorizontally( ) on each of the windows in the affected panes. FIG. 9 shows an example. Here, the topmost window originally has nine panes. The top middle one of these contains a nested splitter window. The cut runs horizontally through the top middle and top right panes. The recursive calls will thus be made on the windows in these two panes. The program uses StartPoint, EndPoint, arrRowHeights, and arrColumnWidths to determine which panes are affected by the cut 1155. Then, using the pointers in matChildPointer the program calls CutHorizontally( ) recursively on all child nodes that the cut runs through 1160.

Figure 10:
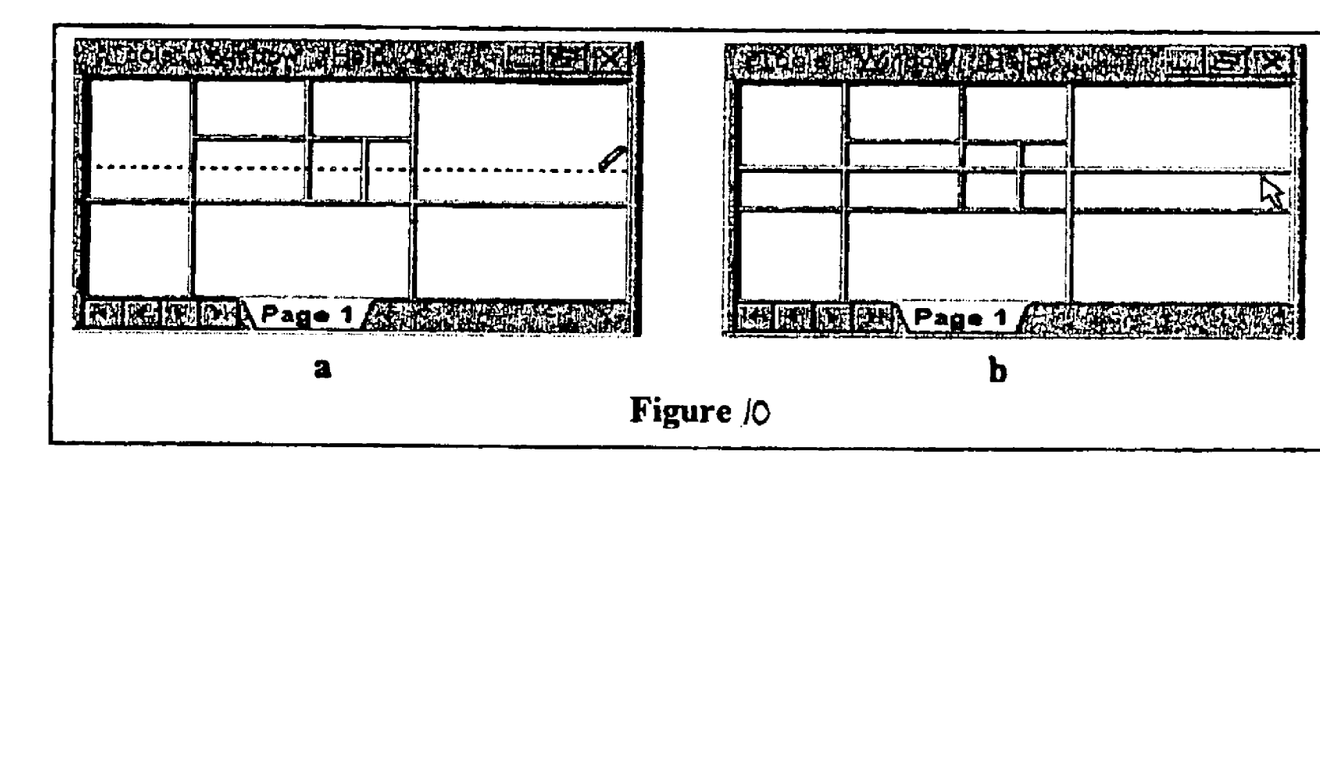
FIG. 10 shows the operation of the mouse-driven splitter used edge to edge.

Finally, CutHorizontally( ) treats the case where the cut runs all the way through the window from edge to edge. The program performs the steps detailed by 1070–1110. The program then queries to determine whether intNumColumns-1 is less than k, which is initially set to 0 (step 1130). If so, the program calls SplitHorizontally( ) on the node pointed to by arrOldRow[k] 1135 and places two pointers returned by SplitHorizontally( ) into matChildPointers[intCutRow][k] and matChildPointers[intCutRow+1][k] 1140. The program then increments k 1145 and performs the same query 1130 and continues in this loop until the query ends. In the example shown in FIG. 10, the row that the cut runs in is replaced with two new rows whose relative heights are determined by the position of the cut within the row. In the example of FIG. 10, the window originally has two rows. The top row is split into two new rows, which together now occupy the space that before was taken by the first row. Modifying intNumRows and arrRowHeights accordingly is a relatively straightforward task. The non-trivial task is to fill the two new rows with windows. This is where the method SplitHorizontally( ) comes in.

SplitHorizontally( ), which is discussed in more detail below, takes a node and produces from it two new nodes, which represent the top and bottom halves of the original node. It returns a pair of pointers, one to the top node and one to the bottom node. Now the two new rows in the node can be filled as follows: for each column, call SplitHorizontally( ) on the window that is being split by the cut, and place the resulting to and bottom halves in the new rows.

Figure 11:
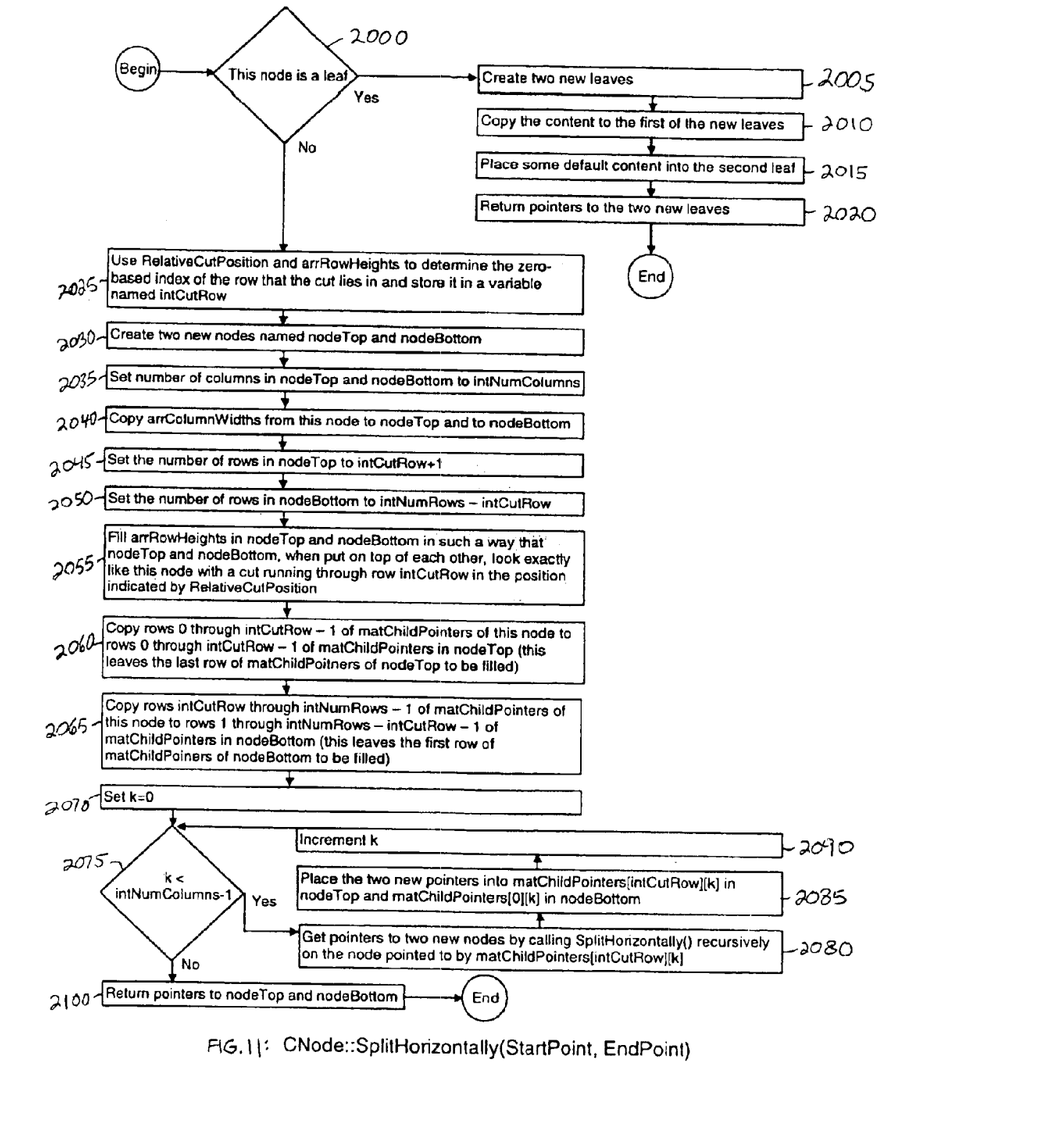
FIG. 11 shows a flowchart of the SplitHorizontally( ) routine.

SplitHorizontally( ) is now discussed. FIG. 11 shows the flowchart for the SplitHorizontally( ) algorithm. First the program queries to determine whether the node is a "leaf" or not 2000. If so, the program creates two new leaves and copies the content of the node to the first of the two new leaves, 2005 and 2010. Default content is placed in the second leaf 2015 and pointers are returned to the two new leaves 2020.

If the node is not a leaf the program engages in steps 2025–2065, ending by setting the k counter to zero 2070. The program then engages in a loop query similar to that of FIG. 10 in steps 2075, 2080, 2085, 2090. Once the query is ended the pointers are returned to nodeTop and nodeBottom 2100.

The goal of this method is to produce two new nodes, a top and a bottom node, which represent what becomes of the current node after it has been split into a top and a bottom half. By visualizing this splitting process, it is not hard to understand how the number of rows and columns, the column widths, and the row heights of the top and bottom node are determined. The child pointers for the most part are copied from the current node to the top and bottom node. The only non-trivial child pointers are the ones in the last row of the top node and the first row of the bottom node. These two rows are what has become of the row that the split ran through. In order to fill these two rows with children, the method SplitHorizontally( ) is recursively used on the windows in the split row. Each of these recursive calls returns pointers to a top half and a bottom half. The top half is placed in the last row of the top node, and the bottom half is placed in the first row of the bottom node.

Figure 12:
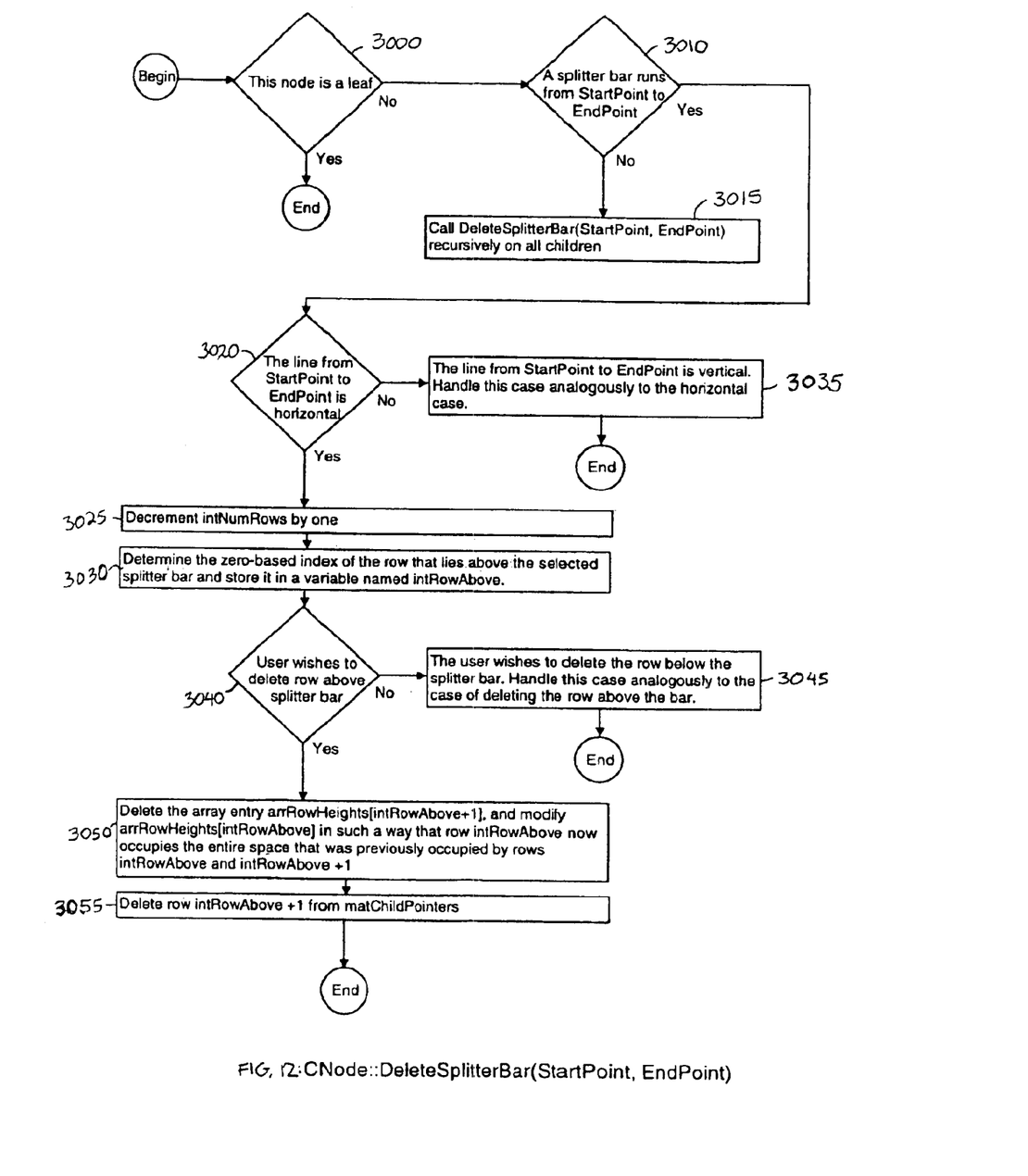
FIG. 12 shows a flowchart of the DeleteSplitterBar routine.

This section describes what happens when the program is notified by the GUI that the user has selected a splitter bar and hit the Delete key. The notification comes with the start and end point of the selected splitter bar. In response to this, the program calls DeleteSplitterBar( ) on the root node. The general idea behind DeleteSplitterBar( ) is to walk the tree of nodes in order to locate the selected splitter bar in one of the splitter windows and then to modify the affected splitter window accordingly. The discussion below assumes that the selected splitter bar is a horizontal one. Again, the vertical case is completely analogous. FIG. 12 shows a flowchart of DeleteSplitterBar routine.

When DeleteSplitterBar( ) is called on a leaf, the function simply returns 3000. That is because leaves represent content windows, not splitter windows, and so a leaf does not have any splitter bars to delete. Note that this case cannot occur at the root level: If the root is itself a leaf, the function DeleteSplitterBar( ) would not have been called in the first place as there are no splitter bars to be selected. However, the leaf case may occur during recursive calls.

When DeleteSplitterBar( ) is called on a node that is not a leaf, i.e., a node that represents a splitter window, the node examines its splitter bars to see if one of them matches the selected splitter bar 3010. If this is not the case, DeleteSplitterBar( ) is called recursively on all children 3015. If the program determines the line is horizontal 3020 it decrements the number of rows by one 3025 and determines the zero-based index of the row that lies above the selected splitter bar and stores it in a variable called intRowAbove 3030. If the line is vertical, the program operates analogously 3035. If, on the other hand, the selected splitter bar turns out to belong to the current node, the program asks the user whether it should drop the row above or below the splitter bar 3040. The program then decrements the number of rows by one and modifies the array of row heights in such a way that the row above the splitter bar occupies the entire space that was previously taken by the two rows above and below the splitter bar 3050 and 3055. Finally, the program drops from the matrix of child pointers the row that corresponds to the row below the deleted splitter bar. Since all row heights are relative heights, no further modification of any children is necessary.

Two additional remarks on the above description of the pane-cutting algorithm are in order. Firstly, the function DeleteSplitterBar( ) can be made more efficient: Since only one splitter bar in the entire tree will match the selected splitter bar, the recursive traversal of the tree can be abandoned as soon as a match has been found and dealt with.

The second remark concerns a situation that may occur during cutting as well as during deletion of a splitter bar. In both cases, some nodes may have their number of rows or columns decremented. It may therefore happen that a node with two rows and one column (i.e., a splitter window with two vertically stacked panes) will see its number of rows go down to one, thus turning it into a splitter window with one row and one column. That would be a splitter window with only one pane. This makes little sense, and most implementations of splitter windows do not even allow it. Hence, the algorithm will detect this case wherever it may occur: it checks for pathological nodes whose matrix of child pointers is the 1__1 matrix. It then copies all data members of the one and only child node to the pathological node and throws away the child node.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range and equivalence thereof are intended to be embraced.

What is claimed is:

1. A mouse driven splitter program comprising:
    means for splitting a display window on a display by dragging a mouse from a begin point in the display to an end point in the display;
    means responsive to said mouse dragging to split said display window into two separate split display windows, each of said split display windows having a newly-formed shared edge substantially aligned with a line that would pass through said begin and end points.

2. The mouse driven splitter program of claim 1, wherein said edge is oriented horizontally.

3. The mouse driven splitter program of claim 1, wherein said edge is oriented vertically.

4. A mouse driven splitter program comprising:
    means for splitting a display window on a display by defining with a mouse two points in said display, said two points defining a line;
    means responsive to said line defining to split said display window into two separate split display windows and dispose said split display windows on opposite sides of said defined line.

5. A method for splitting a display window comprised of a plurality of original panes comprising:

receiving a set of coordinates relative to the display window, the coordinates defining a line transecting two or more original panes; and dividing two or more of the original panes each into two divided panes, each of the two divided panes that correspond to each of the divided original panes having a segment substantially aligned with the transecting line as a newly-formed common edge.

6. A method of splitting a display window comprising:

dragging a cursor from a begin point in the display window to an end point in the display window; and dividing the display window into two separate split display windows, each of said separate split display windows having a newly-formed edge substantially aligned with a line that would pass through the begin and end points.

7. The method according to claim 6, further comprising:

providing a scrollable list box associated with each of the split display windows, each list box containing one or more display options for display in the associated window; and selecting one of the display options for display for each of the split display windows; and displaying within each of the split display windows a visual display associated with the selected display option.

8. The method according to claim 7, wherein one or more of the list boxes includes graphical representations of the display options for display.

9. The method of claim 6, wherein the dragging of the cursor is carried out using one of a mouse, touch screen, touch pad or light pen.

10. The method of claim 6, wherein dragging of the cursor is carried out using one of a joystick, pointing stick, or stylus and tablet.

11. A computer readable medium having stored therein instructions for controlling a computer system to execute splitting of a display window, the instructions including:

obtaining coordinates of a line defined by dragging of a cursor from one point in the display window to another point; and dividing the display window to form two separate split display windows, each of the split display windows having a newly-formed shared edge substantially aligned with at least a portion of the line.

12. A computer readable medium having stored therein a computer program having instructions for controlling a computer system to perform a method of splitting two or more original panes of a display window, the method comprising:

(a) receiving a set of coordinates relative to the display window, the coordinates defining a line transecting the two or more original panes; and (b) dividing two or more of the original panes into each into two divided panes, each of the two divided panes that correspond to each of the divided original panes having a segment substantially aligned with the transecting line as a newly-formed common edge.

13. A system for splitting a display window comprising:

a display;

a computer, including a processor operably connected to the display; and a cursor movement device providing input to the computer; the processor being configured to display on the display one or more original window panes and to divide each of the one or more original window panes on the display into divided panes along a line transecting the one or more window original panes, the line being formed by the cursor movement device, each of the divided panes that correspond to each of the divided original panes having a segment substantially aligned with the transacting line as a newly-formed common edge.

14. A method for splitting a plurality of existing display windows in a display, comprising:

(a) moving a cursor in the display from a begin point to an end point; and (b) dividing at least two of the existing display windows each into two separate split display windows, each of the split display windows that correspond to each divided existing display window having a newly formed shared edge substantially aligned with a line that would pass through the begin and end points.

15. The method of claim 14, wherein the dividing occurs when the begin and end points are disposed at predetermined distances from an edge of one or more existing display windows.

* * * * *

UNITED STATES PATENT AND TRADEMARK OFFICE
CERTIFICATE OF CORRECTION

PATENT NO. : 6,874,128 B1
DATED : March 29, 2005
INVENTOR(S) : Aaron Moore and Thomas Becker It is certified that error appears in the above-identified patent and that said Letters Patent is hereby corrected as shown below:

<u>Title page,</u>
Item [57], ABSTRACT,
Line 1, "is" should read -- are --.
Line 10, "chart" should read -- chart, --

<u>Column 1,</u>
Line 33, "could of course" should read -- could, of course, --.
Line 43, "perhaps even" should read -- perhaps an even --.
Line 56, "not per se pose" should read -- not, per se, pose --.

<u>Column 2,</u>
Line 55, "chart" should read -- chart, --.

<u>Column 3,</u>
Line 27, "mouse" should read -- "mouse," --
Line 36, "The" should read -- the --.

<u>Column 4,</u>
Line 62, "First" should read -- first --.

<u>Column 5,</u>
Lines 6 and 59, "represent" should read -- represents --.

<u>Column 6,</u>
Line 20, "Should" should read -- should --.

<u>Column 7,</u>
Line 5, "to" should read -- top --.
Line 55, "If" should read -- if --.

<u>Column 8,</u>
Line 16, "Since" should read -- since --.

UNITED STATES PATENT AND TRADEMARK OFFICE
CERTIFICATE OF CORRECTION

PATENT NO.     : 6,874,128 B1
DATED          : March 29, 2005
INVENTOR(S)    : Aaron Moore and Thomas Becker It is certified that error appears in the above-identified patent and that said Letters Patent is hereby corrected as shown below:

Column 10,
Line 9, delete the word "into".

Signed and Sealed this

Twenty-eighth Day of June, 2005

JON W. DUDAS
*Director of the United States Patent and Trademark Office*